(12) United States Patent
Gaven et al.

(10) Patent No.: US 6,207,118 B1
(45) Date of Patent: Mar. 27, 2001

(54) MOBILE ULTRAVIOLET RADIATION CURING DEVICE

(76) Inventors: Thomas J. Gaven, 23 Valemont Way, Summit, NJ (US) 07901; Dario V. Bravar, 137 Central Ave., Lodi, NJ (US) 07644; Kenneth A. Kaczmarz, 19 N. Kensington, LaGrange, IL (US) 60525; Michael A. Rau, 9064 Victoria Dr., Eden Prairie, MN (US) 55347

( * ) Notice: Subject to any disclaimer, the term of this patent is extended or adjusted under 35 U.S.C. 154(b) by 0 days.

(21) Appl. No.: 09/356,991

(22) Filed: Jul. 20, 1999

(51) Int. Cl.[7] ....................................... B01J 19/08
(52) U.S. Cl. ..................... 422/186.3; 250/504 R
(58) Field of Search ....................... 422/186.3; 250/504 R

(56) References Cited

U.S. PATENT DOCUMENTS 5,667,850   9/1997   Gaven et al. .

*Primary Examiner*—Kishor Mayekar
(74) *Attorney, Agent, or Firm*—Kenneth P. Glynn, Esq.

(57) ABSTRACT

A mobile ultraviolet substrate coating curing device which is adapted to cure substrate coatings in inaccessible areas, such as floor corners, walls, overhangs, edges and ceilings includes a curved or generally bent ultraviolet vapor lamp source which is coupled with a power efficient mobile curing unit. The present invention is particularly well adapted to cure any expanse with the unique ability to cure even extraordinarily inaccessible areas. The curved ultraviolet vapor lamp may be shuttered, either manually or automatically. The carriage unit may be operated at constant speed to provide uniform curing energy. The curved ultraviolet vapor lamp is preferably situated adjacent to the coated surface and is preferably backed by a reflector which enhances the curved ultraviolet vapor lamp emissions so as to more adequately broadcast the emissions toward all bordering expanses of the substrate coating. The present invention mobile curing unit may be further adapted to use battery power, thus permitting absolute mobility.

19 Claims, 4 Drawing Sheets

MOBILE ULTRAVIOLET RADIATION CURING DEVICE

BACKGROUND OF THE INVENTION

1. Field of the Invention

The present invention relates to curing substrate coatings using ultraviolet radiation and, more particularly, to mobile devices which are uniquely adapted to cure substrate coatings in areas which are inaccessible, such as floor corners, walls, overhangs, edges and ceilings.

2. Information Disclosure Statement

U.S. Pat. No. 5,667,850 to Thomas J. Gaven, inventor herein, describes a method for curing ultraviolet light-curable coatings, inks or adhesives on heat sensitive substrates, wherein the substrates are coated and then passed under ultraviolet light. It includes reducing the temperatures of the substrates while being passed under the ultraviolet light by providing a shield at a location between the ultraviolet light and the substrates. The shield is substantially infrared light reflective and absorptive to prevent infrared light from reaching the substrates and is also substantially ultraviolet light permeable to permit ultraviolet light to reach the substrates. An ultraviolet light curing device which utilizes the aforesaid shield is also described for curing ultraviolet light curable coatings, printings and adhesives on heat sensitive substrates.

Ultraviolet curable substrate coatings are also particularly well suited for use upon floors since they have the desirable characteristics of abrasion resistance, water and chemical resistance, high gloss and so on, while likewise providing a durable coating that will require little care and upkeep.

Conventional ultraviolet curing sources are limited to linear ultraviolet vapor lamps which put out a straight line of light which can be moved across a surface to be cured via a manual or motorized carriage. Surface coatings, in turn, are commonly applied by any conventional coating means, typically about 0.5 to 5 mils thick, over a large surface area. The applicable coatings will not dry until exposed to high intensity ultraviolet radiation. A conventional linear ultraviolet lamp is typically mounted on the front of a carriage and will instantly cure the coating as the carriage is moved over the coating. Conventional ultraviolet curing devices, however, lack sufficient capabilities to cure inaccessible areas such as floor corners, overhangs, walls, ceilings, edges and other like difficult to reach places due to the limited effect of linear ultraviolet vapor lamps which put out a straight line of light. The difficulty in curing the corners of floors, for example, is that conventional linear lamps and the electrode fittings and connections therefore permit diminutive ultraviolet light availability at the edge of the lamp housing. Thus, the portion of the area cured by the light emissions is significantly restricted by the limitations of conventional ultraviolet curing sources.

The present invention solves such limitations by enabling the curing of difficult to reach substrate coated areas using ultraviolet radiation which emanates from a curved or generally bent ultraviolet vapor lamp source. The device taught herein is particularly well adapted to cure any expanse of an area with the unique ability to cure even extraordinarily inaccessible areas.

While it is possible to manually tilt conventional curing devices so as to cure portions of edges or to cure under an overlay, it is nevertheless very difficult to adequately cure entire expanses as well as curing in tight corners. The present invention provides a lamp source and curing equipment configuration which overcomes these obstacles and which yields maximum ultraviolet energy while at the same time minimizing power input. By using a curved lamp, the ultraviolet energy can be easily directed under an overhang and along an edge and into a corner and otherwise. Thus, one object of the present invention is to establish a unique mobile, power efficient ultraviolet radiation substrate curing device that will cure large areas quickly, and will also be capable of curing substrate coatings in floor corners, walls, ceilings and along edges including overhangs. It is another object of the present invention to achieve such curing functions with exceptional power efficiently so, for example, in a given cured area less than ten inches wide a 110 volt 15 amp circuit can be utilized.

Notwithstanding any existing prior art, there are no teachings or suggestions that would render the present invention anticipated or obvious.

SUMMARY OF THE INVENTION

A mobile ultraviolet substrate coating curing device which is uniquely adapted to cure substrate coatings in areas which are inaccessible, such as floor corners, walls, overhangs, edges and ceilings includes a curved or generally bent ultraviolet vapor lamp source which is coupled with a power efficient mobile curing unit. The present invention is particularly well adapted to cure any expanse with the unique ability to cure even extraordinarily inaccessible areas. The curved ultraviolet vapor lamp may be shuttered, either manually or automatically. The present invention carriage unit may be operated at constant speed to provide uniform curing energy. The electrical current outlay provided to the curved ultraviolet vapor lamp may be automatically altered in correlation with the speed of the operation of the carriage unit in order to maintain a constant curing level. The curved ultraviolet vapor lamp is preferably situated adjacent to the coated surface and is preferably backed by a reflector which enhances the curved ultraviolet vapor lamp emissions so as to more adequately broadcast the emissions toward all bordering expanses of the substrate coating. The present invention mobile curing unit may be further adapted to use battery power, thus permitting absolute mobility.

BRIEF DESCRIPTION OF THE DRAWINGS

The present invention should be more fully understood when the specification herein is taken in conjunction with the drawings appended thereto, wherein.

DETAILED DESCRIPTION OF THE PRESENT INVENTION

Figure 1:
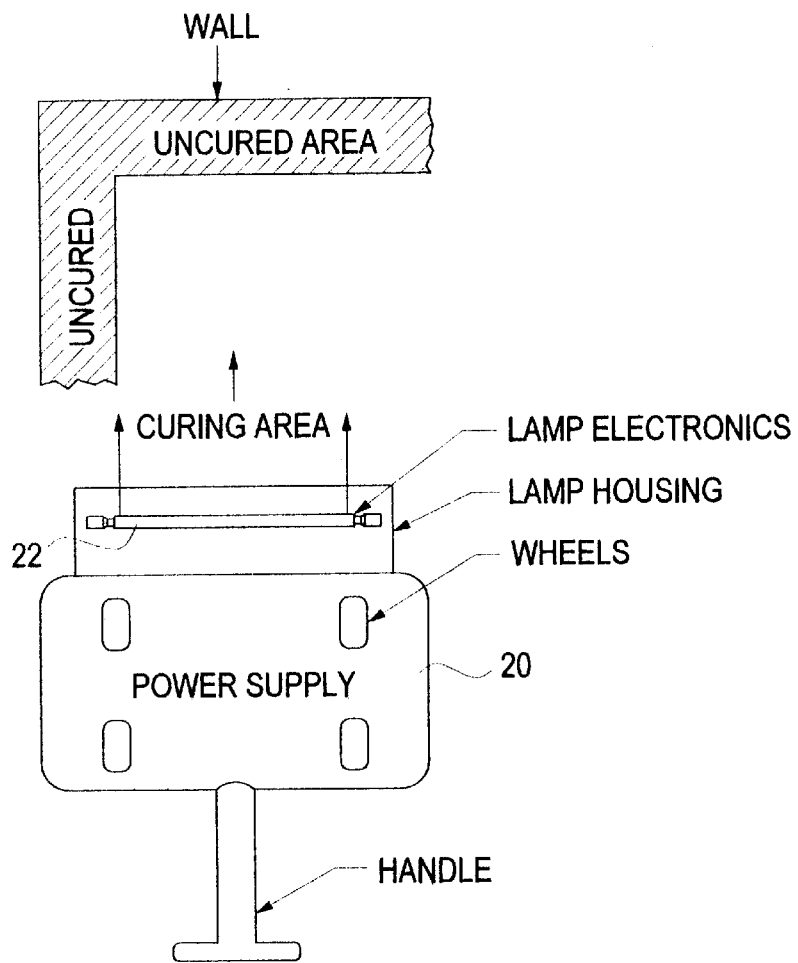
FIG. 1 shows a prior art curing device which utilizes a linear lamp source to cure substrate coatings.

The present invention is a mobile ultraviolet substrate coating curing device which is uniquely adapted to cure substrate coatings in areas which are inaccessible, such as floor corners, walls, overhangs, edges and ceilings. The present invention includes a curved or generally bent ultraviolet vapor lamp source which is coupled with a power efficient mobile curing unit.

The ultraviolet vapor lamp source may comprise any generally curved or bent shape without exceeding the scope of the present invention. The present invention mobile ultraviolet curing device is particularly well adapted to cure any expanse with the unique ability to cure even extraordinarily inaccessible areas. The curved ultraviolet vapor lamp may be shuttered, either manually or automatically. The present invention carriage unit may be operated at a constant speed to provide uniform curing energy or, in the alternative, the speed may be altered in order to vary the curing properties. The electrical current outlay provided to the curved ultraviolet vapor lamp source may likewise be automatically altered in correlation with the speed of the operation of the carriage unit in order to maintain a constant curing level. The curved ultraviolet vapor lamp is preferably situated adjacent to the coated surface and is preferably backed by at least one reflector which enhances the curved ultraviolet vapor lamp emissions so as to more adequately broadcast the emissions toward all bordering expanses of the substrate coating. The present invention mobile curing unit may be further adapted to use battery power, thus permitting absolute mobility. For example, a short arc curved ultraviolet vapor lamp source unit would be very conducive to battery operation.

It is to be understood that a present invention curved ultraviolet vapor lamp source will be capable of curing a wide area, e.g. a 20 inch area on each pass while at the same time curing edges and corners with ease. A smaller unit with a U-shaped lamp may be used for smaller floors and corners and ceilings, e.g. in a residential home. The curved ultraviolet vapor lamp housing is preferably a small bore set in at least one elliptical reflector so as to provide maximum ultraviolet intensity. Because the curved ultraviolet vapor lamp source is so close to the surface to be cured and backed by an elliptical reflector which allows peak lamp emissions to reach the substrate coating, the present invention mobile unit is extremely energy efficient. A typical 15 amp, 110 volt circuit will permit about 1500 watts of lamp energy to be emitted. A 20 inch curved ultraviolet vapor lamp source therefore will have 75 watts per inch available for curing, thereby supplying adequate peak intensity and energy to cure coatings at speeds of about 20 feet per minute. The curved lamp may be shuttered, either manually or automatically. For instance, when the carriage wheels are not turning and the carriage unit is at rest, the shutter may remain closed. Once movement commences, the shutter will open. In addition, the curved ultraviolet vapor lamp source preferably warms up in full power when the shutter is open and switches to a lower standby power once the shutter is closed. An emergency shutter position relay-switch may be utilized to prevent having the curved ultraviolet vapor lamp source reach high power with the shutter closed. It is to be understood, with reference to FIG. 3 below, that a smaller present invention curing unit with a U-shaped ultraviolet vapor lamp may freely be used for curing walls and ceilings and when operated at sufficient power levels may cure opaque paints in addition to clear coatings. In such an instance, the shutter would open only when the unit was in contact with the wall or ceiling.

A more adequate understanding of the present invention will be achieved with reference to the Figures described herein below.

FIG. 1 shows a prior art curing device which utilizes a linear lamp source to cure substrate coatings. Referring to FIG. 1, conventional curing device 20 includes a linear lamp 22. As shown in FIG. 1, linear lamp 22 is capable of curing only that area which is directly located in front of the curing unit, thus, leaving a large uncured area.

Figure 2:
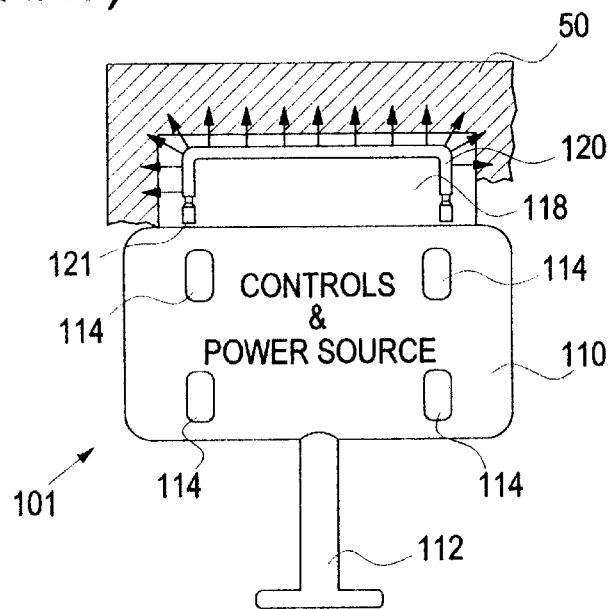
FIG. 2 shows a present invention mobile ultraviolet radiation curing device having a curved ultraviolet vapor lamp source coupled to a carriage unit.

FIG. 2 shows a present invention mobile ultraviolet radiation curing device 101 having a curved ultraviolet vapor lamp source 120 coupled to a carriage unit 110 and is housed in housing 118. As shown, curved ultraviolet vapor lamp source 120 is capable of emitting ultraviolet light in an multi-directional profile upon coated floor surface 50 as demonstrated by the arrows issuing from curved ultraviolet vapor lamp source 120. Curved ultraviolet vapor lamp source 120 is connected to carriage unit 110 by electrical wires to lamp electrodes 121. Carriage unit 110 includes wheels 114 and handle 112 and further includes a power source and controls which may be used to operate mobile ultraviolet radiation curing device 101. Mobile ultraviolet radiation curing device 101 may comprise any size and shape without exceeding the scope of the present invention. Thus, it is to be understood that the exact configuration of the carriage unit as well as the curved ultraviolet vapor lamp source my vary greatly. It is also to be understood that the precise configuration shown in FIG. 2 is merely presented for illustrative purposes and is not meant to limit the scope of the present invention in any way.

Figure 3:
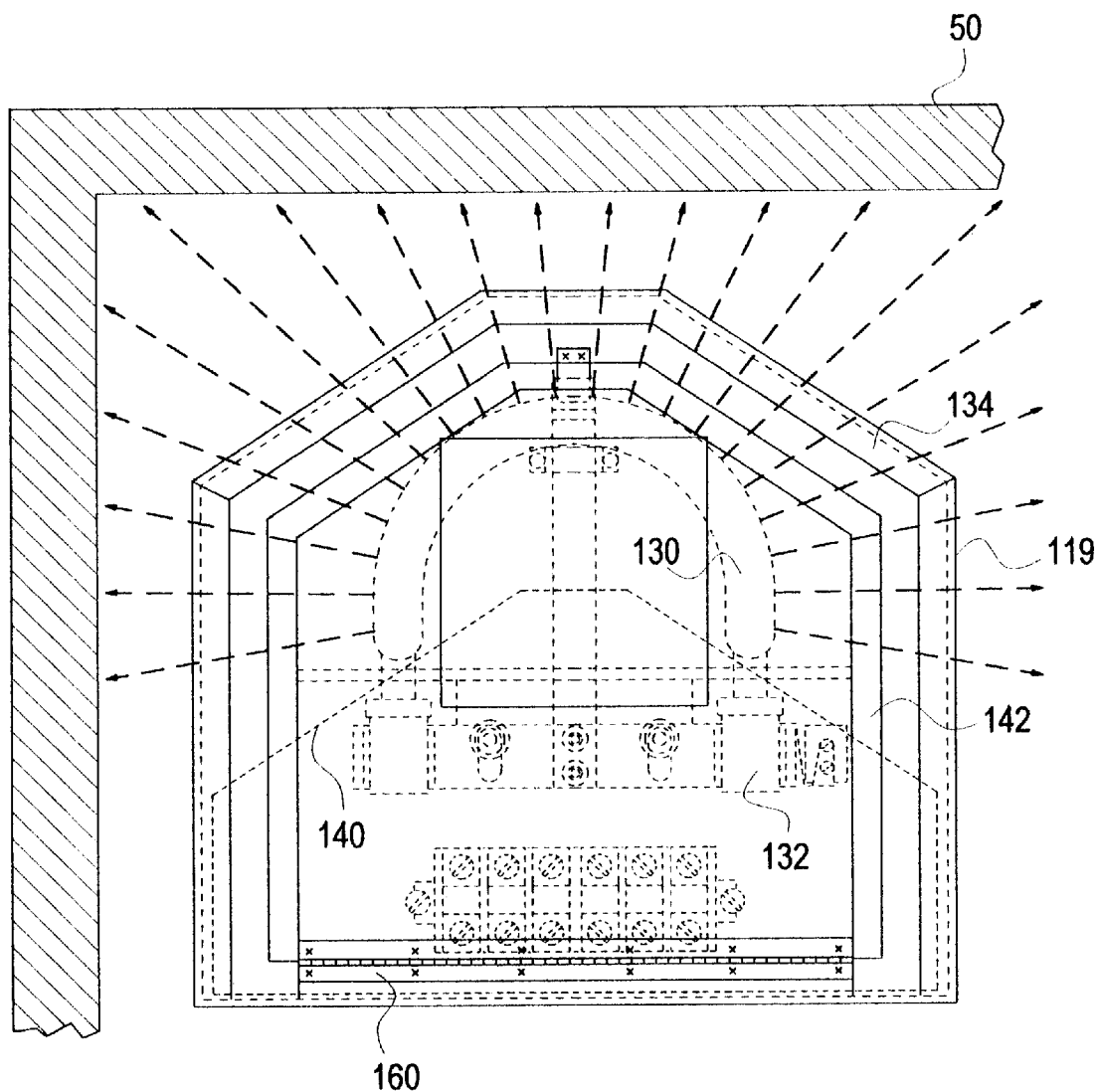
FIG. 3 shows details of an alternative curved ultraviolet vapor lamp source and lamp housing wherein the ultraviolet vapor lamp is U-shaped.
Figure 4:
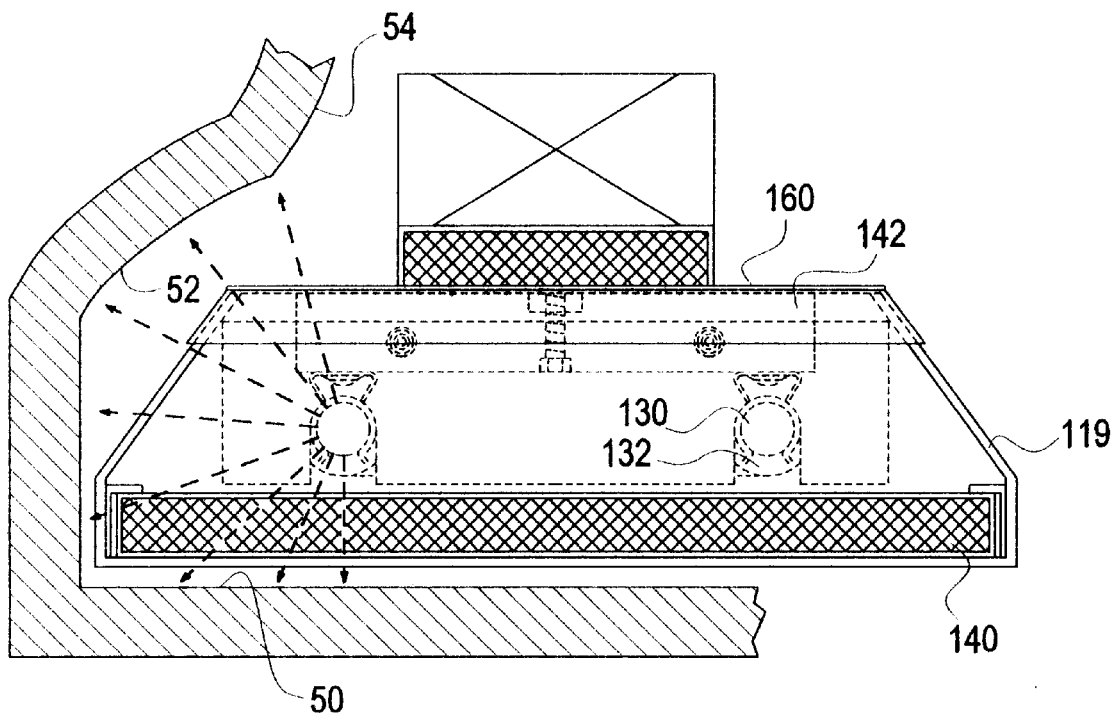
FIG. 4 shows a partial cut side view of the lamp housing shown in FIG. 3.
Figure 5:
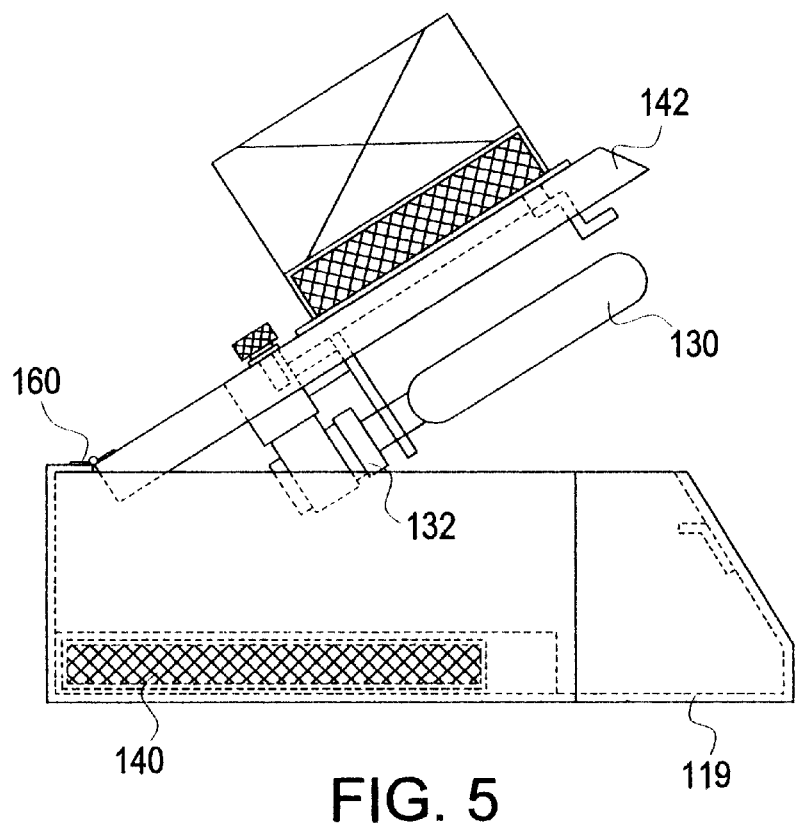
FIG. 5 shows another side view of view of the lamp housing shown in FIG. 3.

FIG. 3 shows details of an alternative curved ultraviolet vapor lamp source 130 and lamp housing 119 wherein the ultraviolet vapor lamp source 130 is U-shaped. FIG. 4 shows a partial cut side view of the lamp housing shown in FIG. 3. FIG. 5 shows another side view of view of the lamp housing shown in FIG. 3. Referring to FIGS. 3 through 5, lamp housing 119 includes reflector 134. U-shaped lamp source 130 is connected to lamp electrodes 132 as shown. Shutter 140 is attached to lamp housing 119 and is configured so as to have a first open position and a second closed position. When shutter 140 is in an open position, as shown here, U-shaped ultraviolet vapor lamp 130 is permitted to emit ultraviolet light toward all curable surfaces. When shutter 140 is in a closed position, the ultraviolet light emissions from U-shaped ultraviolet vapor lamp 130 are blocked. Referring to FIG. 4, floor surface 50 and overhang 52 may easily be cured as demonstrated by the dotted arrows issuing from U-shaped ultraviolet vapor lamp 130 as shown. In addition, housing 119 may be manually positioned against wall 54 in order to cure the entire expanse of wall 54. Referring to FIGS. 4 and 5, housing 119 is shown here to include hinged lid 142 which is connected to housing 119 by hinge 160. Hinged lid 142 may be incorporated to ease the replacement of U-shaped ultraviolet vapor lamp 130.

Figure 6:
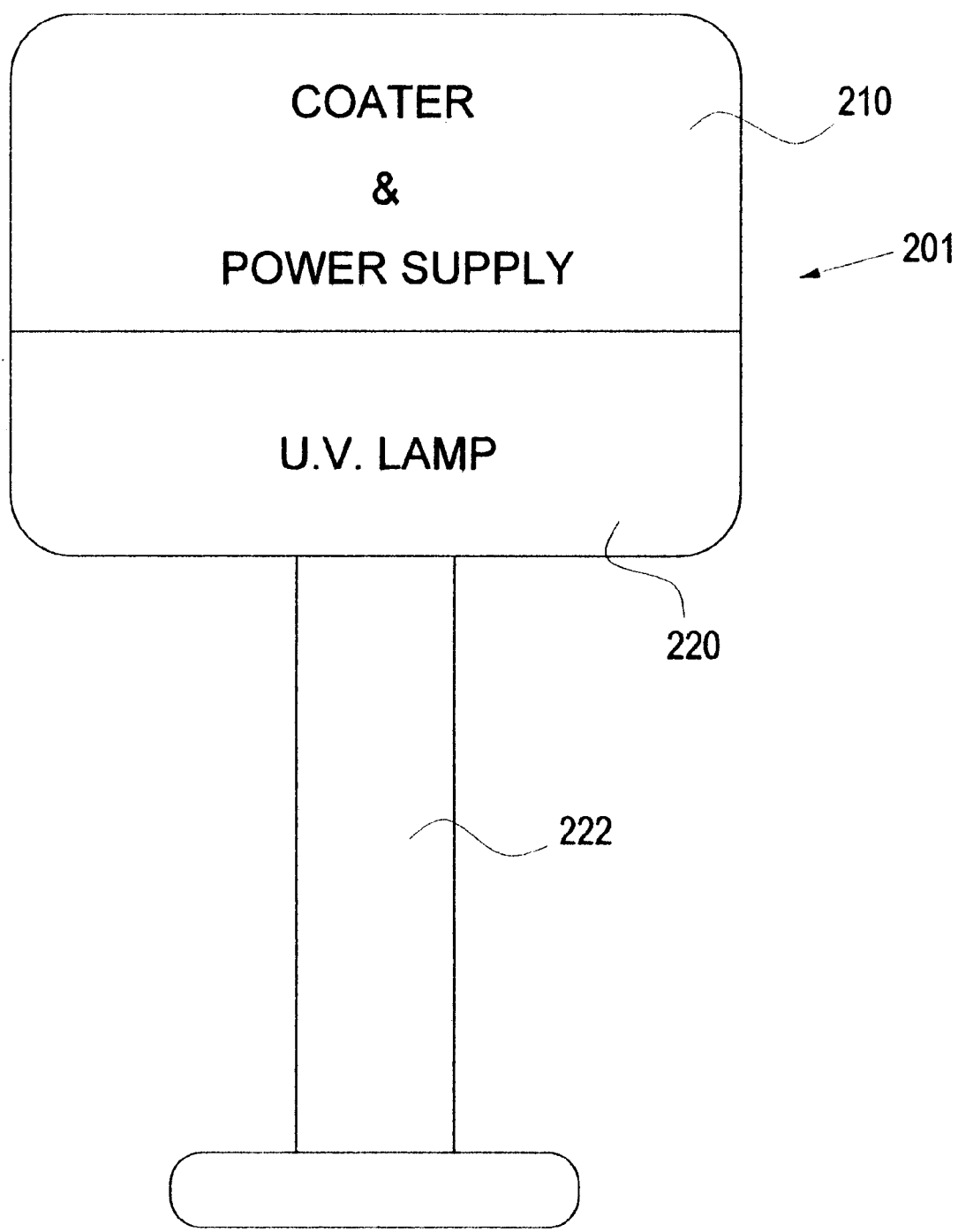
FIG. 6 shows a present invention mobile ultraviolet radiation curing device having a curved ultraviolet vapor lamp source coupled to a carriage unit which at the same time includes a coater for coating expanses with a substrate coating.

FIG. 6 shows a present invention mobile ultraviolet radiation curing device having a curved ultraviolet vapor lamp source 220 coupled to a carriage unit 210 which includes handle 222 and which at the same time includes a coater for coating expanses with a substrate coating and a power source. In this instance, a user may simultaneously coat a surface and cure that same surface completely. The preferred size of the curing unit 201 would be three inches by five inches by twenty-two inches, thereby engendering an ideal curing unit which both cures and coats in a single pass.

Obviously, numerous modifications and variations of the present invention are possible in light of the above teachings. It is therefore understood that within the scope of the appended claims, the invention may be practiced otherwise than as specifically described herein.

What is claimed is:

1. A mobile ultraviolet radiation curing device which comprises:
   (a) a carriage unit having means for controlling the operation of said mobile ultraviolet radiation curing device and having means for enabling motion of said carriage unit across an ultraviolet light curable surface;
   (b) a housing, said housing being attached to said carriage; and
   (c) at least one curved ultraviolet light source attached to said carriage unit, said curved ultraviolet light source being located within said housing.

2. The mobile ultraviolet radiation curing device according to claim 1 wherein said mobile ultraviolet radiation curing device includes a shutter, said shutter being located within said housing, said shutter having a first open position and a second closed position, said shutter being capable of obstructing the emission of light from said curved ultraviolet light source when in said second closed position and having adequate shape and dimension to permit the emission of ultraviolet light from said curved ultraviolet light source when in said first open position, said shutter having means for opening and closing said shutter responsive to said carriage unit controlling means.

3. The mobile ultraviolet radiation curing device according to claim 1 wherein said housing comprises at least one reflector, said reflector being capable of directing and focusing ultraviolet light toward an ultraviolet light curable surface.

4. The mobile ultraviolet radiation curing device according to claim 1 wherein said curved ultraviolet light source is parabolically shaped.

5. The mobile ultraviolet radiation curing device according to claim 1 wherein said curved ultraviolet light source is U-shaped.

6. The mobile ultraviolet radiation curing device according to claim 1 wherein said housing includes a hinged lid.

7. The mobile ultraviolet radiation curing device according to claim 1 wherein said reflector is defined by an elliptical shape.

8. The mobile ultraviolet radiation curing device according to claim 1 wherein said ultraviolet radiation curing device includes a power source.

9. The mobile ultraviolet radiation curing device according to claim 8 wherein said power source is a battery.

10. The mobile ultraviolet radiation curing device according to claim 8 wherein said carriage unit controlling means is capable of regulating the power supplied to said curved ultraviolet light source whereby said carriage unit controlling means decreases the power supplied to said curved ultraviolet light source when said shutter is in said closed position.

11. The mobile ultraviolet radiation curing device according to claim 10 wherein said carriage unit controlling means is further capable of regulating the power supplied to said curved ultraviolet light source whereby said carriage unit controlling means may increase or decrease the power supplied to said curved ultraviolet light source responsive to the relative speed of said carriage unit while in motion across an ultraviolet light curable surface.

12. The mobile ultraviolet radiation curing device according to claim 1 wherein said mobile ultraviolet radiation curing device has adequate size and dimension to permit a user to utilize said mobile ultraviolet radiation curing device to cure floor corners, overhangs, walls, ceilings and edges.

13. The mobile ultraviolet radiation curing device according to claim 12 wherein said mobile ultraviolet radiation curing device includes means for coating a surface with an ultraviolet light curable substrate coating.

14. The mobile ultraviolet radiation curing device according to claim 1 wherein said mobile ultraviolet radiation curing device includes means for coating a surface with an ultraviolet light curable substrate coating.

15. A mobile ultraviolet radiation curing device which comprises:
   (a) a carriage unit having means for controlling the operation of said mobile ultraviolet radiation curing device and having means for enabling motion of said carriage unit across an ultraviolet light curable surface;
   (b) a housing, said housing being attached to said carriage, said housing having at least one reflector, said reflector being capable of directing and focusing ultraviolet light toward an ultraviolet light curable surface;
   (c) at least one curved ultraviolet light source attached to said carriage unit, said curved ultraviolet light source being located within said housing;
   (d) a shutter, said shutter being located within said housing, said shutter having a first open position and a second closed position, said shutter being capable of obstructing the emission of light from said curved ultraviolet light source when in said second closed position and having adequate shape and dimension to permit the emission of ultraviolet light from said curved ultraviolet light source when in said first open position, said shutter having means for opening and closing said shutter responsive to said carriage unit controlling means; and
   (e) means for coating a surface with an ultraviolet light curable substrate coating.

16. The mobile ultraviolet radiation curing device according to claim 15 wherein said ultraviolet radiation curing device includes a power source.

17. The mobile ultraviolet radiation curing device according to claim 16 wherein said power source is a battery.

18. The mobile ultraviolet radiation curing device according to claim 15 wherein said carriage unit controlling means is capable of regulating the power supplied to said curved ultraviolet light source whereby said carriage unit controlling means decreases the power supplied to said curved ultraviolet light source when said shutter is in said closed position, said carriage unit controlling means being further capable of regulating the power supplied to said curved ultraviolet light source whereby said carriage unit controlling means may increase or decrease the power supplied to said curved ultraviolet light source responsive to the relative speed of said carriage unit while in motion across an ultraviolet light curable surface.

19. The mobile ultraviolet radiation curing device according to claim 15 wherein said mobile ultraviolet radiation curing device has adequate size and dimension to permit a user to utilize said mobile ultraviolet radiation curing device to cure floor corners, overhangs, walls, ceilings and edges.

* * * * *